(12) United States Patent
Ducreux et al.

(10) Patent No.: US 10,730,627 B2
(45) Date of Patent: Aug. 4, 2020

(54) SEAT MODULE COMPRISING AN ARMREST WITH AN OPTIMISED DESIGN

(71) Applicant: Safran Seats, Plaisir (FR)

(72) Inventors: Christophe Ducreux, Issoudun (FR); Charles Ehrmann, Les Bréviaires (FR); Benjamin Foucher, Tours (FR)

(73) Assignee: Safran Seats, Plaisir (FR)

( * ) Notice: Subject to any disclaimer, the term of this patent is extended or adjusted under 35 U.S.C. 154(b) by 0 days.

(21) Appl. No.: 15/566,487

(22) PCT Filed: Apr. 5, 2016

(86) PCT No.: PCT/EP2016/057423
§ 371 (c)(1),
(2) Date: Oct. 13, 2017

(87) PCT Pub. No.: WO2016/165980
PCT Pub. Date: Oct. 20, 2016

(65) Prior Publication Data
US 2018/0297708 A1    Oct. 18, 2018

Related U.S. Application Data

(60) Provisional application No. 62/146,662, filed on Apr. 13, 2015.

(51) Int. Cl.
*B64D 11/06* (2006.01)
*B60N 3/00* (2006.01)

(52) U.S. Cl.
CPC .......... *B64D 11/0644* (2014.12); *B60N 3/002* (2013.01); *B64D 11/0604* (2014.12);
(Continued)

(58) Field of Classification Search
None
See application file for complete search history.

(56) References Cited

U.S. PATENT DOCUMENTS 3,661,051 A * 5/1972 Dunne ..................... B25J 13/02
  700/245
4,287,619 A * 9/1981 Brewer ................ A61G 5/1002
  297/411.3
(Continued)

FOREIGN PATENT DOCUMENTS

FR    2943286        9/2010
GB    2288728 A  * 11/1995  ......... B64D 11/0693
(Continued)

OTHER PUBLICATIONS

International Patent Application No. PCT/EP2016/057423, Search Report (including translation) and Written Opinion (including translation), dated Jun. 14, 2016.
(Continued)

*Primary Examiner* — David E Allred
(74) *Attorney, Agent, or Firm* — Kilpatrick Townsend & Stockton LLP

(57) ABSTRACT

The invention relates mainly to a seat module intended to be installed in an aircraft cabin comprising:
  a seat,
  a cushion positioned near the seat, and
  an armrest that can move between a lowered position, and a raised position, wherein the armrest comprises an upper wall and a lower wall, such that
  the upper wall extends in line with the cushion when the armrest is in the lowered position, and
  the lower wall extends in line with the cushion when the armrest is in the raised position.

4 Claims, 5 Drawing Sheets

(52) U.S. Cl.
CPC ........ *B64D 11/064* (2014.12); *B64D 11/0605* (2014.12); *B64D 11/0606* (2014.12); *B64D 11/0627* (2014.12); *B64D 11/0638* (2014.12)

(56) References Cited

U.S. PATENT DOCUMENTS

| | | | | |
|---|---|---|---|---|
| 4,447,920 A * | 5/1984 | Rosen | .................... | A47C 1/023 297/383 |
| 4,740,044 A * | 4/1988 | Taylor | .................... | A47B 21/03 312/196 |
| 4,925,255 A * | 5/1990 | DeBlaay | ................ | A47B 17/04 312/204 |
| 5,048,901 A * | 9/1991 | DeBlaay | ................ | A47B 17/04 312/204 |
| 5,797,666 A * | 8/1998 | Park | .................... | A47B 21/0073 312/223.3 |
| 5,908,221 A * | 6/1999 | Neil | ....................... | A47C 1/03 297/411.36 |
| 5,911,470 A * | 6/1999 | Aumond | ................ | B60N 3/107 297/115 |
| 6,044,776 A * | 4/2000 | Alizade | .................... | E05G 1/024 109/78 |
| 6,050,638 A * | 4/2000 | West, III | .................... | A47C 7/62 297/188.09 |
| 6,427,258 B1* | 8/2002 | Gooley | ................ | A61G 7/1003 4/559 |
| 6,556,678 B1* | 4/2003 | Boyce | .................... | A47B 21/00 379/454 |
| 6,846,042 B2* | 1/2005 | Hanson | ................ | A61G 5/006 297/115 |
| 7,946,532 B2* | 5/2011 | Martin | .................... | B60N 2/34 244/118.6 |
| 8,306,254 B2* | 11/2012 | Schmidt | ................ | H04R 1/025 381/189 |
| 9,604,724 B2* | 3/2017 | Savard | .................... | B64D 11/06 |
| 9,682,779 B2* | 6/2017 | Hasegawa | ............ | B64D 11/06 |
| 9,919,800 B2* | 3/2018 | Cailleteau | ............. | B60N 2/345 |
| 2003/0030251 A1* | 2/2003 | Malassigne | .............. | A61G 5/08 280/648 |
| 2005/0046315 A1* | 3/2005 | Doane | .................... | A47B 17/02 312/196 |
| 2006/0097553 A1 | 3/2006 | Spurlock et al. | | |
| 2007/0210209 A1* | 9/2007 | Saint-Jalmes | .......... | B64D 11/06 244/119 |
| 2009/0302158 A1* | 12/2009 | Darbyshire | ............ | B64D 11/06 244/118.6 |
| 2010/0065683 A1* | 3/2010 | Darbyshire | ............ | B64D 11/06 244/118.6 |
| 2011/0163575 A1* | 7/2011 | Kramer | .................... | A47C 7/62 297/144 |
| 2017/0327015 A1* | 11/2017 | Siess | ..................... | B60N 2/763 |

FOREIGN PATENT DOCUMENTS

| | | | |
|---|---|---|---|
| JP | S622652 U | | 1/1987 |
| JP | H08169265 A | | 7/1996 |
| JP | 2005198873 A | * | 7/2005 |
| JP | 2009538251 A | | 11/2009 |
| WO | 2005030580 | | 4/2005 |
| WO | 2007135373 A2 | | 11/2007 |

OTHER PUBLICATIONS

Japan Patent Application No. 2017-553316, Notice of Reasons for Rejection, dated Mar. 24, 2020.

* cited by examiner

SEAT MODULE COMPRISING AN ARMREST WITH AN OPTIMISED DESIGN

CROSS REFERENCE TO RELATED APPLICATIONS

This patent application is the U.S. national stage entry of PCT/EP2016/057423, filed Apr. 5, 2016, which application claims the benefit of U.S. Provisional Application No. 62/146,662, filed Apr. 13, 2015 and entitled FIXTURES FOR ANGLED BUSINESS CLASS SEATS (TRAY TABLE AND ARMREST WITH STOWAGE SPACE), both of which are incorporated in their entireties by this reference.

The present invention relates to a seat module comprising an armrest with an optimized design.

Seat modules designed to be installed in an aircraft cabin are known, and they comprise a seat capable of assuming at least a sitting position and a tilted position, and a shell positioned around the seat. Cushions offset laterally relative to the seat make it possible to maximize the passenger's resting surface, particularly when the seat is in the tilted position. The drawback of existing designs is that some of the resting surface is lost when the retractable armrest of the seat is in the raised position.

The invention aims to effectively remedy this drawback by proposing a seat module intended to be installed in an aircraft cabin comprising:
a seat,
a cushion positioned near the seat, and
an armrest that can move between a lowered position, and a raised position,
characterized in that the armrest comprises an upper wall and a lower wall, such that
the upper wall extends in line with the cushion when the armrest is in the lowered position, and
the lower wall extends in line with the cushion when the armrest is in the raised position.

The invention makes it possible to maximize the surface of the cushion, irrespective of the position of the armrest.

According to one embodiment, the lower wall has an opening, in particular closed by a cover. This enables the passenger to store small objects inside this storage volume such as, for example, a pair of spectacles.

According to one embodiment, the armrest has an open form on the seat side.

According to one embodiment, a storage device is incorporated into the arm rest.

According to one embodiment, the cushion is positioned in the same plane as a surface of the seat when the seat is in the tilted position.

According to one embodiment, the seat module comprises an energy-storage device capable of storing mechanical energy upon displacement of the armrest from the raised position toward the lowered position and of releasing this mechanical energy to facilitate a passage from the lowered position to the raised position.

According to one embodiment, the seat module comprises a means for controlling the release of the energy stored in the energy-storage device.

According to one embodiment, the control means is located inside a housing delimited by two notches made, respectively, in the upper wall of the armrest and in the cushion.

Of course, different features, variants and/or embodiments of the present invention may be associated with one another in accordance with various combinations in so far as they are not incompatible with one another or exclude one another.

The present invention will be better understood and further features and advantages will become more clearly apparent upon reading the following detailed description comprising embodiments given by way of illustration with reference to the appended figures, presented by way of non-limiting examples, which may be used to supplement comprehension of the present invention and the description of its implementation and, as appropriate, to contribute to its definition, in which.

It should be noted that in the figures the structural and/or functional elements common to various embodiments may have the same references. Thus, unless mentioned otherwise, such elements have identical structural, dimensional and material properties.

Figure 2A:
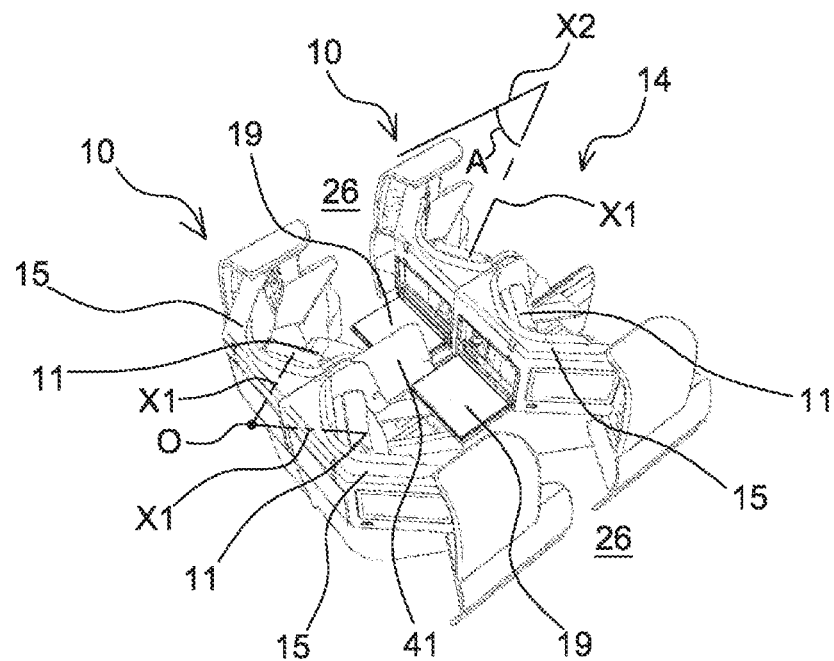
FIGS. 2a and 2b are perspective views illustrating the incorporation of a retractable wall allowing the creation of a collaborative working zone for two-seat modules according to the invention.
Figure 2B:
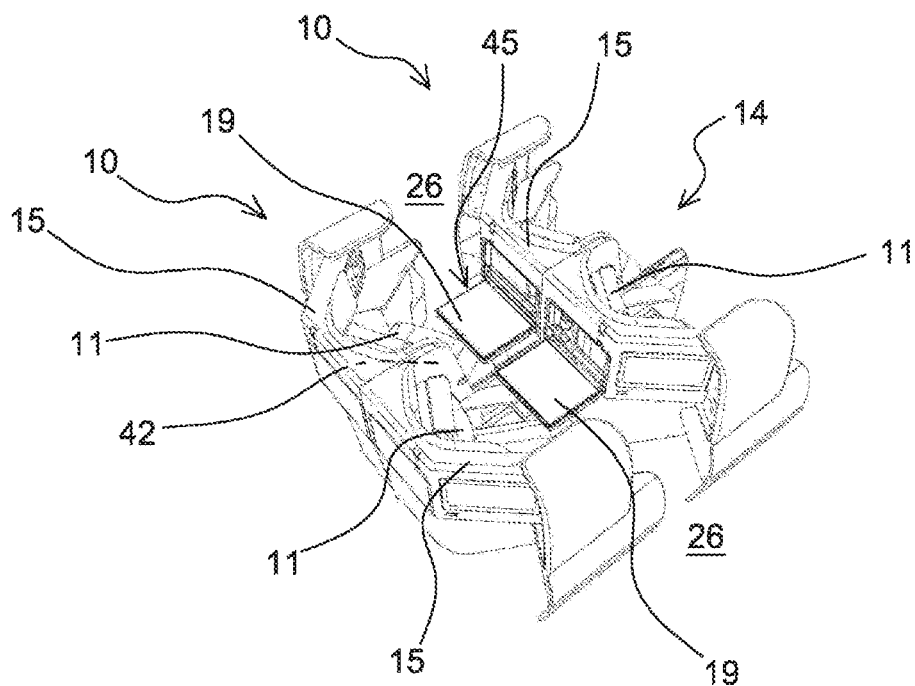

As illustrated by FIGS. 2a and 2b, an arrangement of an aircraft cabin 14 comprises a row of at least two seat modules 10 positioned one behind the other. Within the row, the seat modules 10 may be oriented such that the seats are turned toward the front and/or toward the rear of the aircraft.

However, it should be noted that in the remainder of the description the terms "front" and "rear" locally define the relative position of the seats within the row and do not refer in any way to an orientation of the seats inside the aircraft cabin. In other words, the expression "front seat module" means that the seat module is positioned directly in front of another seat module within the row, while the expression "rear seat module" means that the seat module is positioned directly behind another seat module within the row.

As may be clearly seen in FIGS. 1a to 1d, a seat module 10 comprises at least one seat 11, advantageously provided with a kinematic system that enables it to be moved between a raised position, in which the seat 11 is configured to define a sitting position for a passenger, and a tilted position, in which the seat 11 is configured to define a passenger lying surface, which is advantageously substantially horizontal.

The seat 11 comprises an axis of extension X1 defined by the intersection between a horizontal plane and a vertical mid-plane of the seat 11. Advantageously, the vertical mid-plane of the seat 11 is also a plane of symmetry of the seat 11.

According to an illustrative embodiment presented in the figures, the axis of extension X1 of the seat 11 is inclined relative to a longitudinal axis X2 of the aircraft. In such an arrangement, the axis of extension X1 of the seat 11 and the longitudinal axis X2 of the aircraft together form an angle A, which can be seen in FIG. 2a.

Furthermore, the seat module 10 comprises at least one shell 15 that makes it possible, in particular, to guarantee the privacy of the passenger seated on the seat 11. According to a particular alternate embodiment, the shell 15 surrounds the seat 11 at least in part. Moreover, the shell 15 may also surround an armrest 18 of the seat 11 at least in part.

Figure 1A:
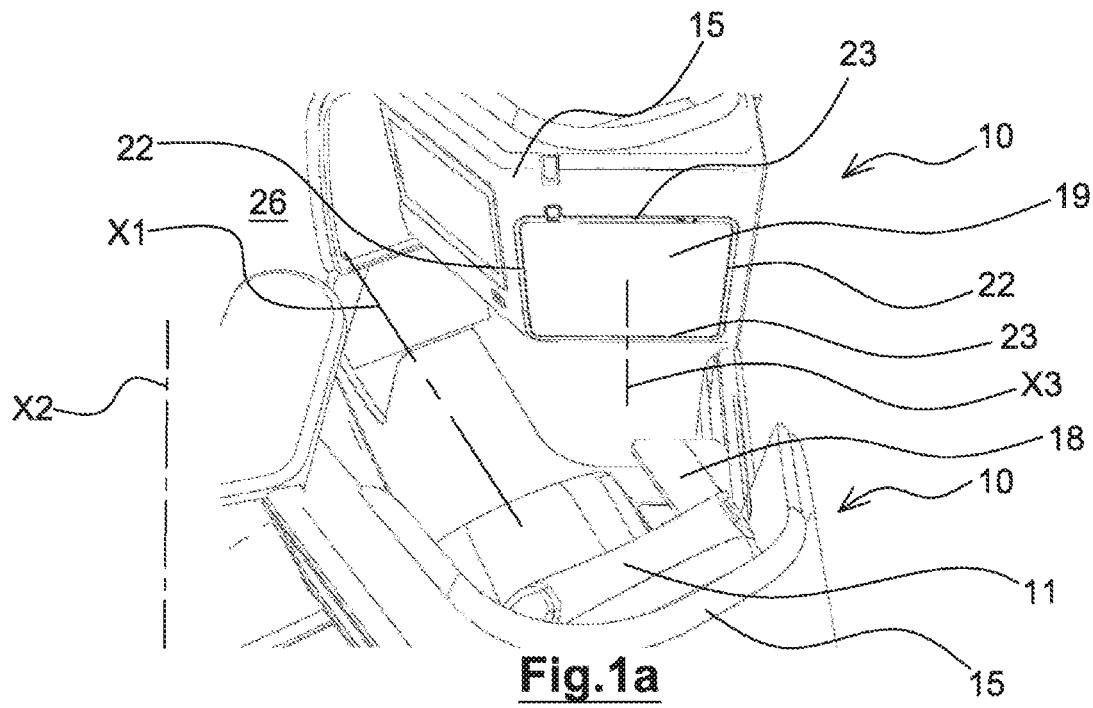
FIGS. 1a to 1d are perspective views illustrating different positions of a tray table of a seat module according to the present invention.
Figure 1B:
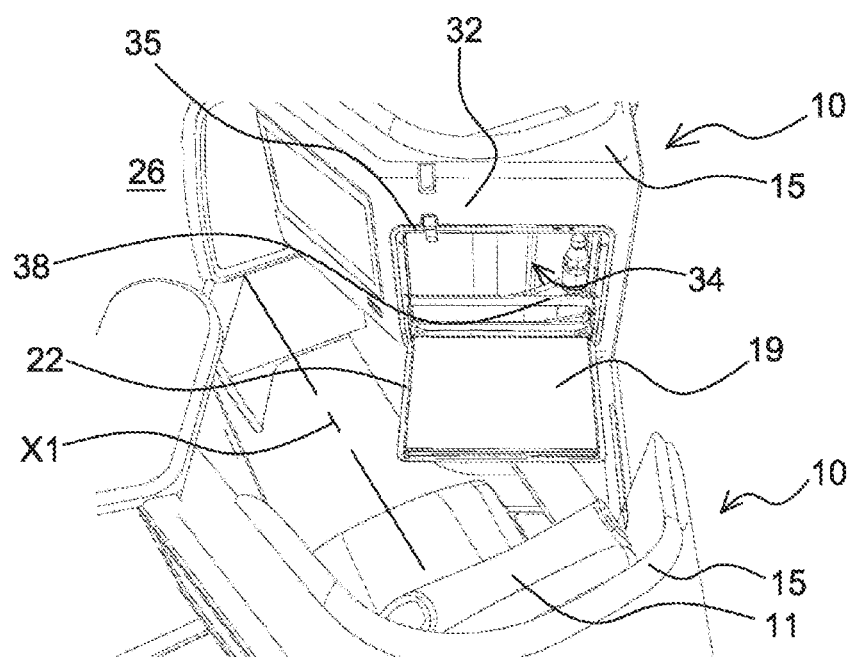

Furthermore, the seat module 10 also comprises at least one tray table 19, positioned in particular on a rear face of the shell 15. The tray table 19 can move between a stowed position, as shown in FIG. 1a, and a folded-down position, as shown in FIG. 1b. Preferably, the tray table 19 may have an offset folded-down position.

When the tray table 19 is in the stowed position, an axis X3 normal to a rear face of the tray table 19 is inclined relative to the axis of extension X1 of the corresponding seat 11. "Inclined" is understood to mean the fact that the normal axis X3 and the axis of extension X1 form a non-zero angle relative to one another.

As may be seen in FIG. 1b, a lateral edge 22 of the tray table 19 is tilted relative to the axis of extension X1 of the corresponding seat 11 when the tray table 19 is in the offset deployed position. "Tilted" is understood to mean the fact that the lateral edge 22 and the axis of extension X1 form a non-zero angle relative to one another.

It should be noted that the lateral edge 22 mentioned in the present description corresponds to one of the edges of the tray table 19 having a substantially vertical orientation when the tray table 19 is in the stowed position.

Moreover, the tray table 19 may also comprise at least one transverse edge 23 having a substantially horizontal orientation, as shown in FIG. 1a.

Thus, in the folded-down position, the vertical mid-plane of the rear seat 11 does not cross the tray table 19 of the front seat 11, which is thus offset relative to the passenger. This makes it possible to facilitate access by the passenger to an aisle 26 of the aircraft, which can be seen in FIGS. 2a and 2b.

Figure 1C:
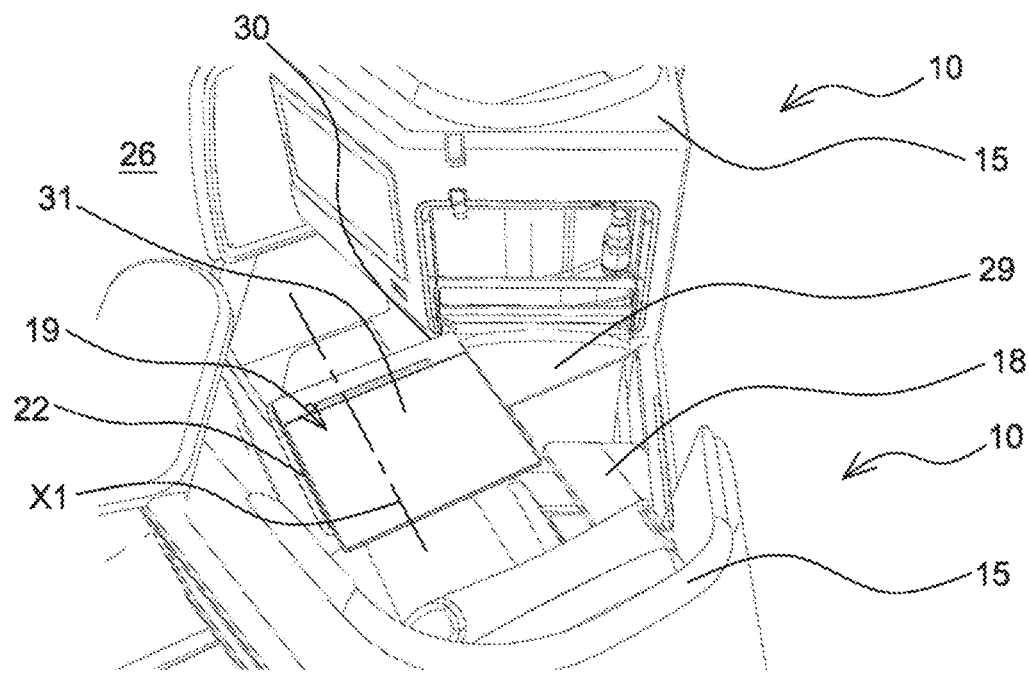

The tray table 19 can also move in translation and/or rotation relative to the seat 11, to pass from the folded-down position to an offset folded-down position, as shown in FIG. 1c.

When the tray table 19 is in the offset folded-down position, the axis of extension X1 of the seat 11 is substantially parallel to the lateral edge 22 of the tray table 19 and/or substantially perpendicular to the transverse edge 23 of the tray table 19.

In the offset folded-down position, the vertical mid-plane of the rear seat 11 crosses the tray table 19 of the front seat 11. The tray table 19 is thus located opposite the passenger who is then comfortably installed in order to enjoy his meal or to work.

Preferably, the tray table 19 can also move in translation in a displacement direction D1, advantageously parallel to the axis of extension X1 of the seat 11, about the offset folded-down position. It is thus possible to adapt a distance of separation between the tray table 19 and the passenger.

In order to ensure the displacements from one position to the other, the tray table 19 comprises a support 29, which can be seen in FIG. 1c. The support 29 is preferably mounted so as to move in rotation relative to the shell 15, in particular via a hinge 30 installed on the shell 15, in order to allow its passage from the stowed position to the folded-down position.

The tray table 19 also comprises a top 31, which can advantageously move, particularly in translation and/or in rotation, relative to the support 29, in order to allow the passage of the tray table 19 from the folded-down position to the offset folded-down position, and vice versa.

Moreover, as may be seen in FIG. 1b, a portion 32 of the shell 15 and the rear face of the seat 11 delimits an internal volume 34 accessible via an opening 35 made in the shell 15.

The opening 35 is advantageously, in full or in part, closed off by the tray table 19 when the tray table 19 is in the stowed position.

In addition, a storage device 38 is positioned inside the internal volume 34. Such a storage device 38 may, for example, have the form of a bottle holder or a document holder.

In the illustrative embodiment of FIGS. 2a and 2b, the seat module 10 comprises two seats 11 and two shells 15 positioned, respectively, about a corresponding seat 11. In particular, the axes of extension X1 of the two seats 11 of one and the same seat module 10 are tilted relative to one another and cross at a point of intersection O. According to an advantageous variant embodiment, the point of intersection O is located behind the seats 11. Thus, each seat 11 of the seat module 10 is turned toward the aisle 26. The seats 11 of the seat module 10 are oriented in different directions.

As a supplement, a wall 41 is positioned between the two seats 11. Advantageously, the wall 41 can be retracted and may be displaced between a deployed position, as shown in FIG. 2a, and a retracted position, as shown in FIG. 2b. In the retracted position, the wall 41 may be positioned inside a housing 42, preferably located at a junction between the shells 15 of the seats 11 of the seat module 10.

Placing the wall 41 in the retracted position makes it possible to create a collaborative working zone 45 when the tray tables 19 of the two seats 11 of the module 10 are in the folded-down position, so as to be positioned one beside the other. Preferably, the separation between the two lateral edges 22 of the tray tables 19 facing one another is less than 50 cm, preferably less than 30 cm.

Figure 1D:
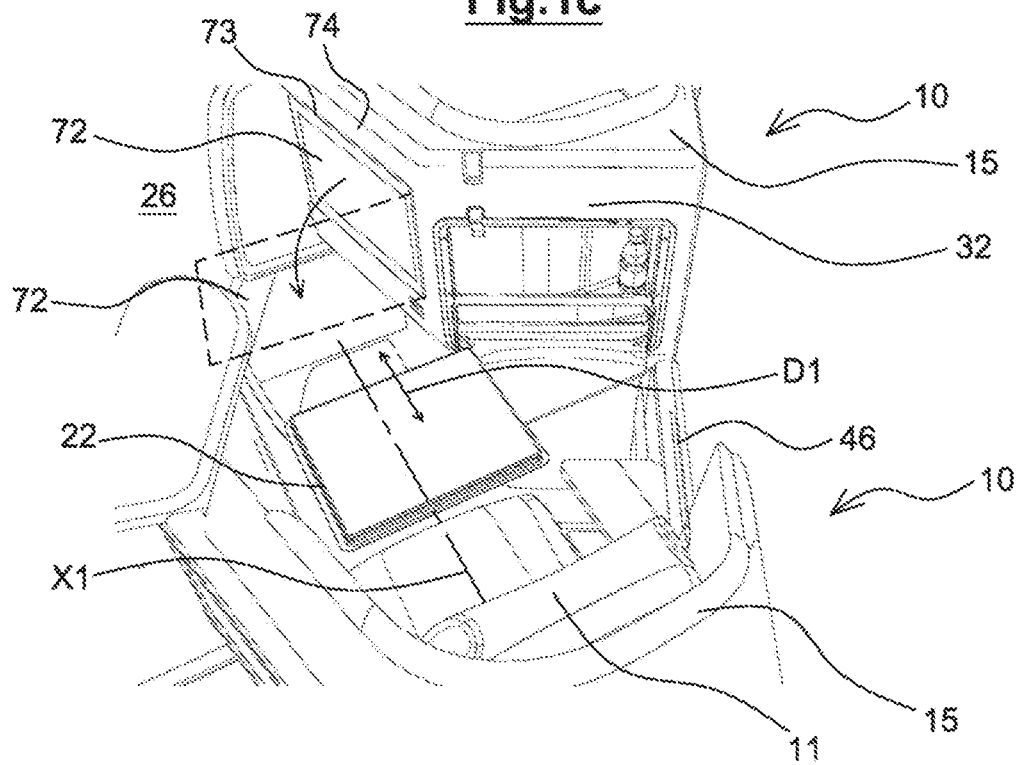

The passage of the retractable wall 41 from a retracted position to a deployed position may be obtained by sliding the wall 41 along a slide 46 made in one of the shells 15 of the seat 11, which can be seen in particular in FIG. 1d.

The seat module 10 comprising two seats 11 may be made as a single unit comprising two seats 11 and one shell 15 surrounding, at least in part, the two seats 11, or formed from two half-units assembled together and each comprising a seat 11 and an associated shell 15.

In certain embodiments, such as those illustrated in FIGS. 3a, 3b, 4a, 4b, the seat module 10 comprises a cushion 47 located near the seat 11. The cushion 47 is preferably a cushion for maximizing the lying surface intended to be positioned in the same plane as the surface of the seat 11 when the latter is in the extended position. In a variant, the cushion 47 may, however, be positioned at a different level. Advantageously, the cushion 47 is offset laterally relative to the seat 11.

Figure 3A:
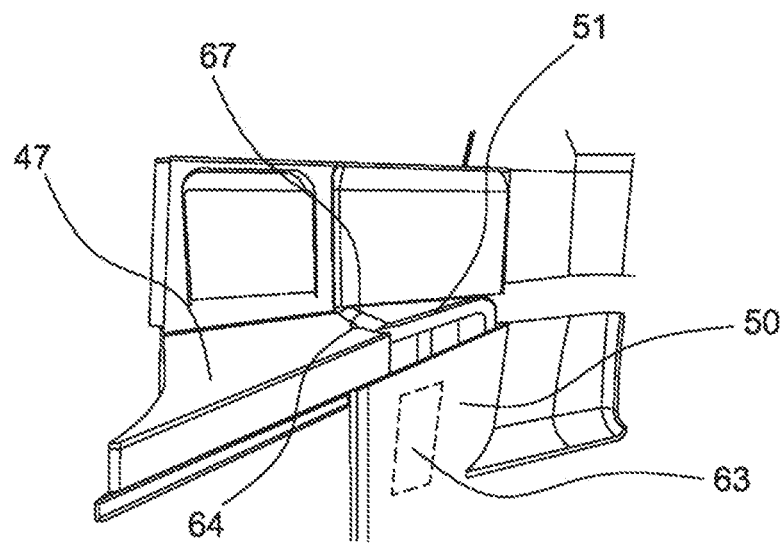
FIGS. 3a and 3b are perspective views illustrating an armrest, in a lowered position and in a raised position, respectively, according to the present invention.
Figure 3B:
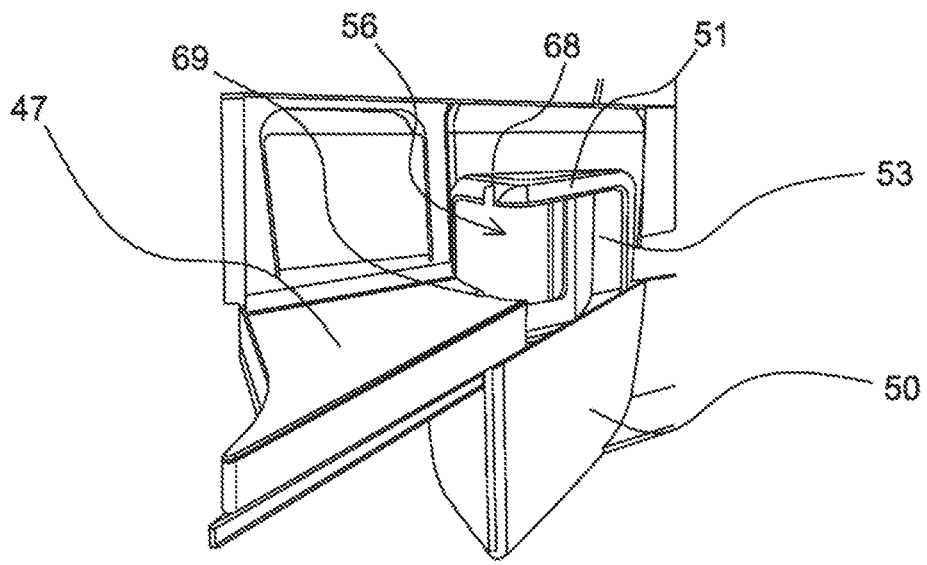

Moreover, according to a variant embodiment, the armrest 18 can move between a lowered position, as shown in FIG. 3a, and a raised position, as shown in FIG. 3b. The passage from the lowered position to the raised position of the armrest 18 may, in particular, be achieved with the aid of a slide mechanism, installed preferably in a casing 50 receiving the armrest 18 when the latter is in the lowered position.

Figure 4A:
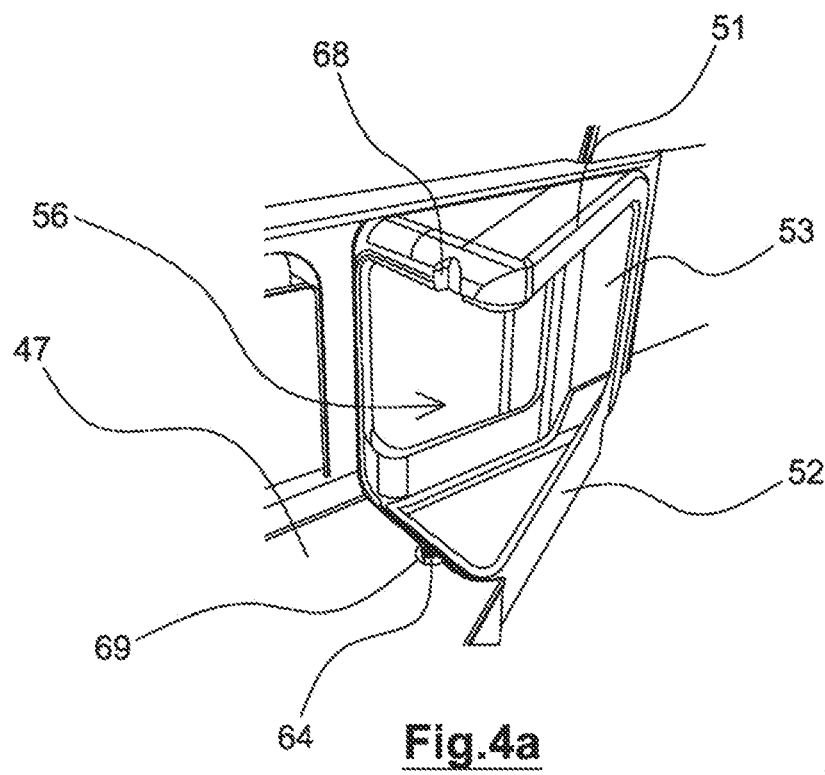
FIGS. 4a and 4b are detailed perspective views illustrating a removable cover of an upper wall of an armrest, in a closed position and in an open position, respectively, according to the invention.

As may be seen in FIG. 4a, the armrest 18 may comprise an upper wall 51 on which the passenger may bear, resting his elbow thereon when the armrest 18 is in the raised position, and may comprise a lower wall 52. The upper wall 51 and the lower wall 52 are connected together by a linking wall 53. Advantageously, the linking wall 53 is offset toward an exterior surface of the armrest 18. Arranged in this way, the lower wall 52 is located on the opposite side from the upper wall 51. The armrest 18 thus has an open form on the seat 11 side.

An arrangement of this type makes it possible to define an internal armrest volume. It is then possible to incorporate into the internal volume a storage device 56, such as a document holder.

As illustrated in FIG. 3a, according to a preferred illustrative embodiment, the upper wall 51 of the armrest 18 extends in line with the cushion 47, when the armrest 18 is in the lowered position. Furthermore, as illustrated in FIG. 4a, the lower wall 52 of the armrest 18 extends in line with the cushion 47 when the armrest 18 is in the raised position and the upper wall 51 projects relative to the cushion 47. A configuration of this type makes it possible to maximize the lying surface, irrespective of the position of the armrest 18 relative to the cushion 47.

Figure 4B:
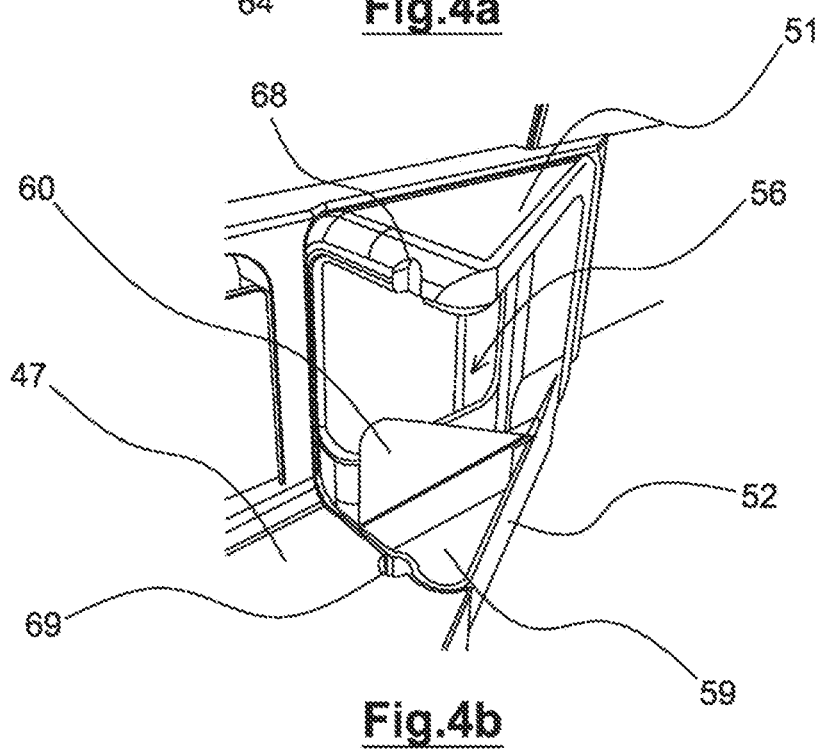

Preferably, the lower wall 52 of the armrest 18 has an opening 59, for example closed by a cover 60, which is, in particular, removable, as shown in FIG. 4b. The opening 59 provides access to a storage volume arranged under the lower wall 52 and, in particular, arranged in the casing 50 receiving the armrest 18. This enables the passenger to store small objects inside the storage volume 59, for example a pair of spectacles.

According to a variant embodiment, an energy-storage device 63 is arranged in the casing 50 or in the armrest 18. The energy-storage device 63 is shown schematically in FIG. 3a. The energy-storage device 63 is capable of storing mechanical energy at the time of a displacement of the armrest 18 from the raised position toward the lowered position and to release this mechanical energy to facilitate the passage from the lowered position to the raised position. The energy-storage device 63 may, for example, take the form of a gas or spring ram.

Complementarily, a control means 64 capable of permitting the release of the energy stored by the energy-storage device 63, such as a button, is located near the armrest 18. Preferably, the control means 64 is arranged inside a housing 67 that can be accessed by the passenger. According to a particular embodiment, the housing 67 is delimited by two notches 68, 69 made in the upper wall 51 of the armrest 18 and in the cushion 47, respectively.

It will be appreciated that an armrest 18 of this type may be installed on the seat module 10 described previously, but also on any other type of seat module 10 or any other type of seat 11 that comprises a cushion 47 and the ergonomics of which it is desired to improve.

Also, a display device 72 of a multimedia system, such as a screen, is mounted so that it can move relative to the shell 15 between a stowed position, in which the display device 72 is positioned inside a housing 73 made in a portion 74 of the shell 15, and a deployed position, in which the display device 72 is located opposite the passenger, in particular in a position in which the axis of extension X1 of the seat 11 is perpendicular to the display device 72, as shown in FIG. 1d.

The portion 32 of the shell 15 delimiting the internal volume 34, capable of defining the storage device 38, and the portion 74 of the shell 15 delimiting the housing 73, capable of receiving the display device 72, are tilted relative to one another.

Of course, the invention is not limited to the embodiments described previously and provided solely by way of example. It encompasses diverse modifications, alternate forms and other variants that a person skilled in the art might envisage within the context of the present invention and, in particular, all combinations of the various functioning modes described previously, which may be taken separately or in association.

The invention claimed is:

1. A seat module intended to be installed in an aircraft cabin comprising:
    a seat cushion having an upper surface,
    an armrest positioned adjacent the seat cushion that can move between a lowered position and a raised position,
    a stationary cushion positioned forward of the armrest and laterally offset from the seat cushion;
    an energy-storage device;
    wherein the armrest comprises an upper shelf and a lower shelf;
    wherein the seat module comprises a bed position, wherein, in the bed position, the seat module is positioned substantially horizontal;
    wherein an upper surface of the upper shelf, an upper surface of the stationary cushion, and the upper surface of the seat cushion are arranged in a same plane to form a first substantially planar bed surface when the seat module is in the bed position and the armrest is in the lowered position,
    wherein an upper surface of the lower shelf, the upper surface of the stationary cushion, and the upper surface of the seat cushion are arranged in the same plane to form a second substantially planar bed surface when the seat module is in the bed position and the armrest is in the raised position, and
    wherein the first substantially planar bed surface and the second substantially planar bed surface have substantially the same dimensions;
    wherein the energy-storage device is capable of storing mechanical energy upon displacement of the armrest from the raised position toward the lowered position and of releasing this mechanical energy to facilitate a passage from the lowered position to the raised position;
    wherein the seat module further comprises a means for controlling the release of the mechanical energy stored in the energy-storage device; and
    wherein the means for controlling is located inside a housing delimited by two notches made, respectively, in the upper shelf of the armrest and in the stationary cushion.

2. The seat module as claimed in claim 1, wherein the lower shelf comprises a stowage box positioned within the lower shelf, wherein the upper surface of the lower shelf forms a cover of the stowage box.

3. The seat module as claimed in claim 1, wherein the armrest has an open form facing the seat cushion.

4. The seat module as claimed in claim 3, wherein a storage device is incorporated into the armrest.

* * * * *